United States Patent [19]

Fratini, Jr. et al.

[11] Patent Number: 5,046,285
[45] Date of Patent: Sep. 10, 1991

[54] VACUUM SYSTEM FOR DEFLATING WEATHERSTRIPS

[75] Inventors: Albert V. Fratini, Jr.; Jack E. Smith, both of Dayton, Ohio

[73] Assignee: General Motors Corporation, Detroit, Mich.

[21] Appl. No.: 583,107

[22] Filed: Sep. 17, 1990

[51] Int. Cl.$^5$ .............................................. E06B 7/16
[52] U.S. Cl. ..................................... 49/477; 296/146; 296/212
[58] Field of Search ................... 49/477, 31; 296/212, 296/146

[56] References Cited

U.S. PATENT DOCUMENTS

| | | | |
|---|---|---|---|
| 2,469,131 | 5/1949 | Ross | 49/477 |
| 4,761,917 | 8/1988 | Knecht et al. | 49/477 |
| 4,805,347 | 2/1989 | Smith | 49/477 |
| 4,813,184 | 3/1989 | Weimar | 49/477 |
| 4,924,629 | 5/1990 | Smith et al. | 49/477 |

*Primary Examiner*—Philip C. Kannan
*Attorney, Agent, or Firm*—Ronald L. Phillips

[57] ABSTRACT

A sealing apparatus for a vehicle closure, such as a door, includes a vacuum system for deflating the vehicle weatherstrips or sealing members. A plurality of deflatable sealing members may be connected to a single vacuum source. The system includes a sensor/actuator for detecting motion of the individual vehicle closures and a flow control circuit including valve arrangements for selectively connecting a particular sealing member to the vacuum source. In response to detected closing motion of a particular closure, the sealing member associated with that closure is deflated to allow the closure to close and latch with relatively low effort. Once closed, the sealing member is vented to atmosphere and reexpands by resilient memory to full cross-section thereby providing a relatively tight interference seal. The closure motion sensor/actuator includes a flexible strip having a series of aligned, closely spaced apertures and a cooperating pawl and actuator lever for operating the valves.

8 Claims, 3 Drawing Sheets

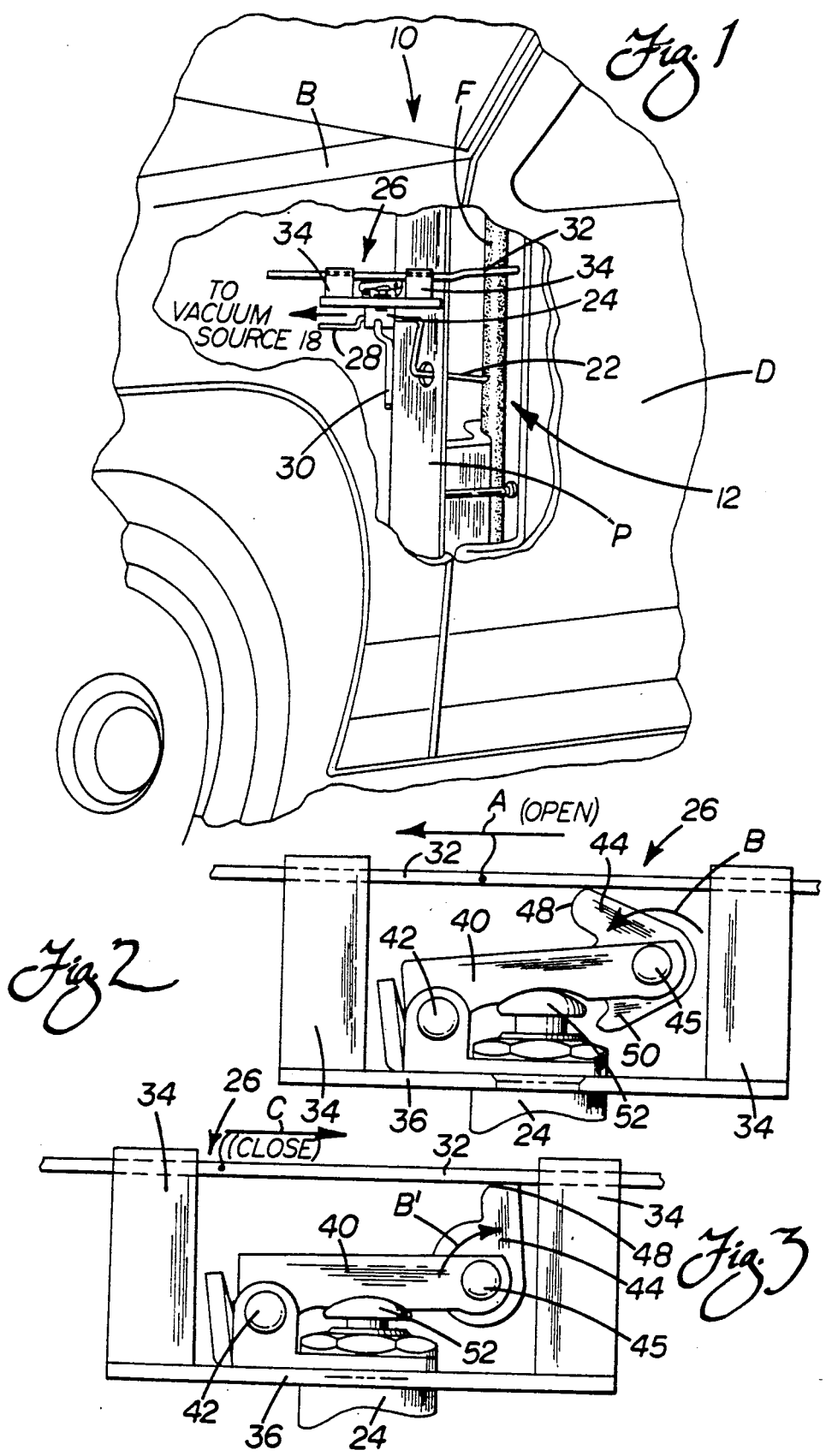

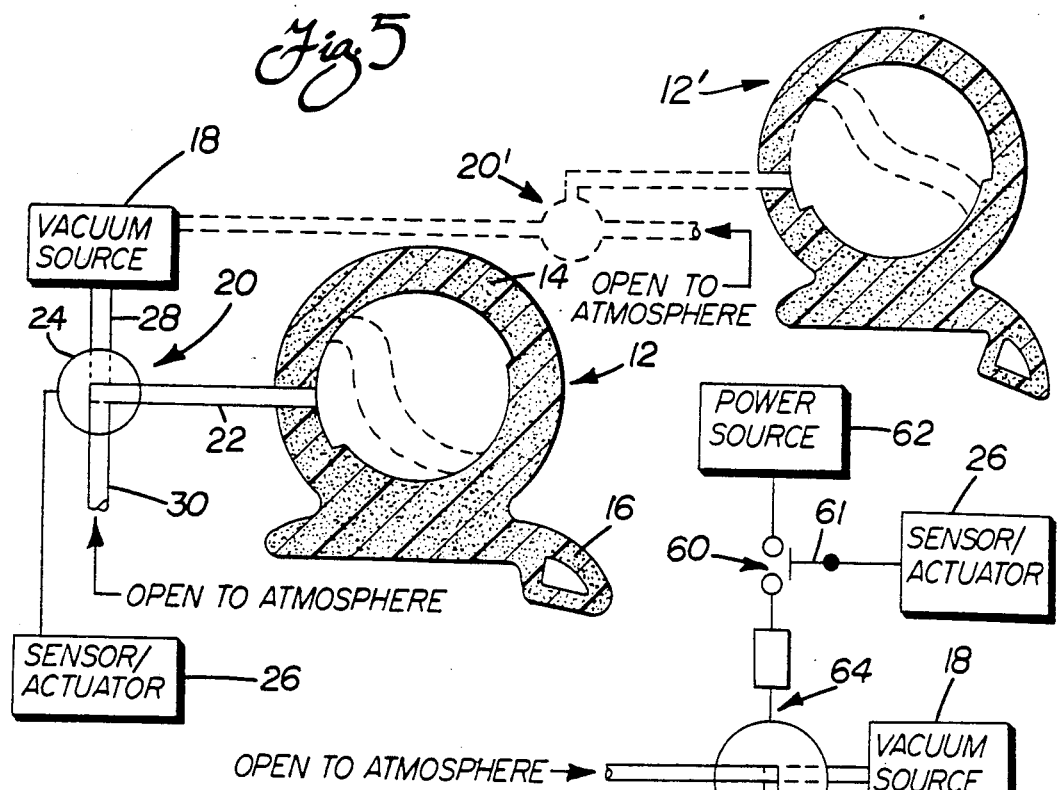
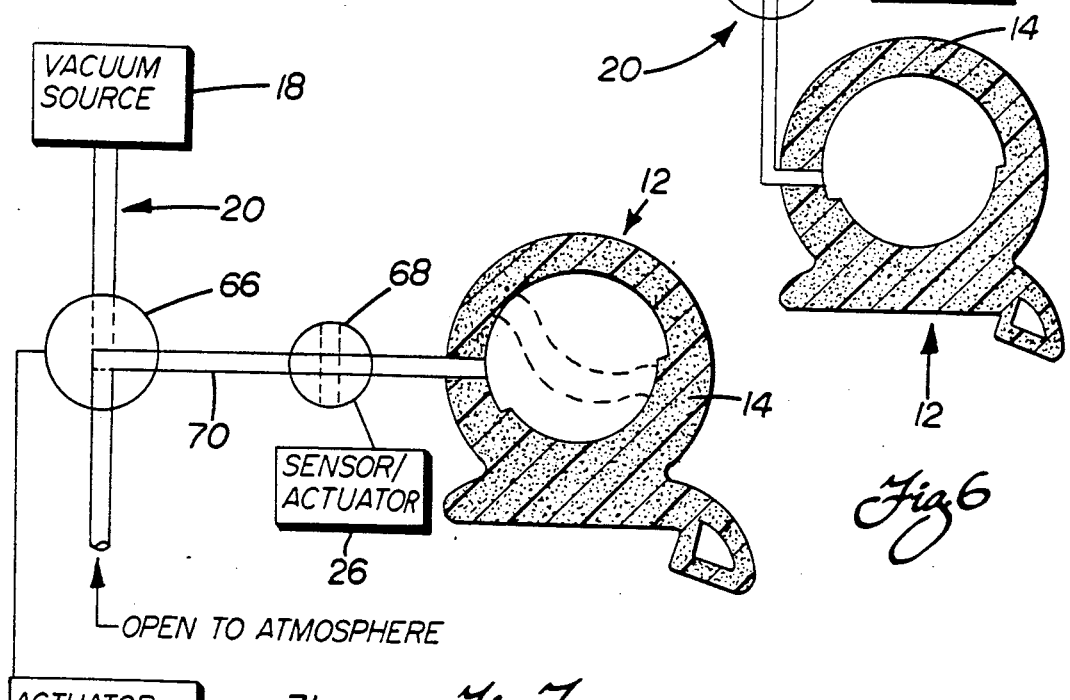

VACUUM SYSTEM FOR DEFLATING WEATHERSTRIPS

TECHNICAL FIELD

The present invention relates generally to a system for sealing of closures and, more particularly, to a sealing apparatus for vehicle closures including a vacuum operated control circuit to deflate multiple weatherstrips so as to provide relatively low closing effort for each closure, but providing an exceptionally firm, tight seal upon reinflation.

BACKGROUND OF THE INVENTION

Closed cell sponge weatherstrips have been the standard for years to seal vehicle closures against the passage of air and moisture. The weatherstrip attaches to the vehicle body or closure around the opening (e.g. door or trunk opening). The weatherstrip preferably includes a bulbular or tubular section that is designed to provide an interference fit between the closure and body, and a mounting section to secure the weatherstrip in place. Generally, the greater the interference, the better the sealing function is obtained.

A tight seal is important in order to isolate passengers from inclement weather conditions and also to reduce wind noise as the vehicle passes through the air. The tighter the degree of interference of the weatherstrip between the closure and closure frame, however, the greater the effort is required to close the closure.

Another consideration of a higher degree of interference is the annoying problem of "compression shock". The rapid closing of a door on an otherwise closed vehicle often results in a trapping of air and a momentary air compression in the passenger compartment. This compression shock not only further increases the closing effort required, but also causes an unpleasant feeling to the passengers.

Until recently, attempts to reduce door closing effort resulted in reduced sealing efficiency. Conversely, early attempts to improve sealing resulted in a need for excessive closing effort. Neither extreme is favored by consumers. Thus, in the past, automotive engineers found it necessary to compromise these apparently conflicting engineering requirements, with the best designs carefully balancing the relationship between sealing and closing effort. Of course, any solution that is the result of compromise fails to provide either the most desired closing effort or the best sealing. Accordingly, a significant need existed for a system that could independently address the requirements and provide better sealing while also maintaining closing effort at a desired level.

One of the best approaches to date and one that effectively addresses the conflicting concerns for improved sealing and reduced closing effort is set forth in U.S. Pat. No. 4,761,917 entitled "Deflatable Weatherstrips", issued Aug. 9, 1988, of which I am a co-inventor. In this patent a system is described that provides both improved sealing and reduced closing effort of vehicular closures by utilizing the concept of deflatable weatherstrips. With this approach, a deflatable sealing member forms a weatherstrip to seal the opening in the vehicle body around the closure. The sealing member is connected to a vacuum source such as a bellows pump mounted in the hinge area of the closure. When the closure is closed, the sealing member is deflated so as not to engage in an interference fit between the door and closure. In this manner, closing effort is reduced and compression shock substantially eliminated. Following closing, the sealing member is vented to ambient pressure. This causes the sealing member to expand by built-in resilient memory to provide firm sealing engagement with increased resilient interference between the closure and the body. Advantageously, better sealing is thereby provided. Accordingly, wind noise is reduced and passenger comfort is enhanced.

Space limitations and design constraints particularly in compact automobile models, however, make it very difficult to mount a bellows pump in position in the hinge area between the closure and the frame. U.S. Pat. No. 4,805,347 issued Feb. 21, 1989, entitled Bellows System for Deflating Weatherstrips of which I also am the inventor, addresses this problem by providing a closure sealing mechanism wherein a bellows pump, actuated by closure movement, is specially adapted for convenient mounting in a space anywhere on the closure or the frame adjacent but spaced from the hinge area. While this improved system may be adapted for utilization in some compact automobiles where insufficient space exists in the hinge area to utilize the original design of U.S. Pat. No. 4,761,917 certain vehicle designs still do not have the necessary space to effectively incorporate this design.

Additionally, since both of these prior art systems include an individual deflation or vacuum unit for each sealing member, there is a duplication of components that adds significantly to system cost, while also potentially increasing maintenance requirements. Also, since the vacuum volume generated by each bellows is necessarily limited, there is a lack of reserve vacuum, which can present a problem in terms of attaining full deflection of the sealing member. This may occur where the closure is opened only partially and then closed.

The present invention addresses these problems by providing a centralized vacuum source that may be selectively connected to a plurality of deflatable sealing members. Thus, advantages in packaging convenience in the vehicle, cost over the prior art and improved operation are provided. The centralized vacuum source incorporating the desired capacity to assure appropriate reserve, may be mounted at any convenient location within the vehicle body including the engine compartment. Hence, it may be adapted for use for any desired number of closures and in substantially any vehicle including compact and subcompact models.

It should also by appreciated that the operational problems resulting from small system leaks that have plagued previous centralized systems are minimized by the present invention. This is done by providing a means to actuate the vacuum source only upon the closing movement of the closure. Thus, negative pressure need only be maintained for a very short period of time (i.e. the pressure is provided for only the one or two seconds during door closing). At all other positions of the closure, the vacuum is blocked and the weatherstrip is opened to the atmosphere to allow expansion to full cross-section by built-in resilient memory. As a result, the desired tight seal is provided.

SUMMARY OF THE INVENTION

Accordingly, it is a primary object of the present invention to provide a more energy and cost efficient apparatus for sealing between a closure and a body that provides improved interference sealing while also maintaining a desired relatively low closing effort.

An additional object of the present invention is to provide a sealing apparatus for swinging closures including integral automatic controls to regulate operation.

Still another object of the present invention is to provide a sealing apparatus for swinging closures that may be especially adapted for smaller compact vehicles. The apparatus utilizes a single central vacuum source, such as the engine vacuum reserve tank or an electrical vacuum pump connected to multiple sealing members, one associated with each vehicular closure. Accordingly, the present invention provides better packaging convenience and lower system cost than prior art systems requiring separate deflation units for each sealing member.

Yet another object of the present invention is to provide a sealing apparatus that utilizes a special ratcheting sensor to detect closing motion of a closure. In response to this detected closing motion, the sealing member associated with that closure is deflated. Accordingly, as the closure latches closing effort is minimized, and air is allowed to pass through the substantially peripheral gap around the seal, and thereby eliminate the annoying problem of compression shock. Once closed, the sealing member is vented to atmosphere and expands under the influence of resilient memory to provide a tight interference fit between the closure and the body for better sealing and improved passenger comfort.

Additional objects, advantages, and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus and related control circuit is provided for assuring tight sealing of a vehicular closure, such a swinging door, hatchback door or trunk lid of an automobile.

The apparatus includes a plurality of resilient sealing members each having a deflatable bulbular or tubular section. Each sealing member is associated with a cooperating vehicular closure. A mounting section is provided on each sealing member to fix the sealing member either around the inner peripheral margin of a cooperating closure or to the vehicle body around the entire periphery of the opening. When the door is closed and the sealing member inflated, a tight interference seal is provided between the door and the body that prevents the passage of air and moisture.

A single vacuum source as, for example, the engine vacuum reserve tank or a separate electrical vacuum pump, is selectively connected to the sealing members. When the negative pressure of the vacuum source is selectively applied to a sealing member, the tubular section of that sealing member deflates and collapses. Conversely, when air and ambient pressure is readmitted to the sealing member, the tubular section reexpands due to its resilient memory.

The apparatus also includes means for sensing the movement or motion of a particular closure and actuating a valve in a flow control circuit to selectively provide fluid communication between the deflatable sealing members and the vacuum source or ambient atmosphere. According to the invention, alternative flow control valves coupled with the motion sensor/actuator may be used for controlling the deflation and inflation of the individual sealing members. Simple closure or door jamb button actuators are used to operate the valve upon the door reaching the full closed position. Some examples of the valves suitable for use include mechanically actuated push action valves, pneumatically actuated valves, electrical solenoid valves and fluidic devices.

Preferably, the apparatus is designed so that negative pressure is selectively applied to deflate a particular sealing member as the closure associated with that sealing member is closing. With the sealing member deflated and thus collapsed, the degree of interference between the sealing member and the closure or closure frame is reduced or even substantially eliminated at the instant of full closure. Thus, the force required to overcome the interference and latch the door is advantageously reduced proportionally. Consequently, a desirable, relatively low closing effort is all that is required to operate the door. In addition, it should be recognized that because the operative tubular section of the sealing member is collapsed, a space exists between the sealing member and the closure or closure frame. Accordingly, the passage for air from the interior of the vehicle around the sealing member is provided. Consequently, the unpleasant problem of compression shock, characteristic of many prior art closure sealing systems is avoided.

The control circuit utilized in the present invention may include a single mechanical three-way push action valve (with spring return) or a single three-way solenoid valve connected to an electrical power source through a switch. In both instances the unique motion sensor/actuator of the invention serves to operate the valve and/or switch. The sealing member is under vacuum during closing and open to atmosphere when fully closed.

Alternatively, a pair of the push action valves may be provided in each line between the vacuum source and a particular deflatable sealing member. More particularly, the mechanical action valves may comprise in combination a three-way valve actuated by the jamb button actuator and a two-way valve actuated by the motion sensor/actuator. The three-way valve includes ports communicating with the vacuum source, the atmosphere, and the two-way valve. The two-way push action valve includes ports communicating with the three-way push action valve and the deflatable sealing member. In response to detected closing movement of the closure by the sensor/actuator, the two-way valve is actuated to provide communication between the three-way valve and the two-way valve. The two-way valve thus provides direct communication to the deflatable sealing member causing deflation of the sealing member. Vacuum is applied until the jamb button actuator switches the three-way valve to atmosphere when the door is fully closed.

In yet another embodiment a power source is connected to first and second electrical switches in series. The first switch is responsive to the closure motion sensor/actuator for operating a three-way solenoid valve; the ports in the valve communicating with the vacuum source, the atmosphere, and the particular sealing member. The first electrical switch is normally open and only closed upon sensing closing movement of the associated closure. The second electrical switch is normally closed and only opened by direct closure contact with its button actuator when the closure is closed all the way. In this manner, the circuit is also advantageously operative to activate the solenoid valve and provide direct communication between the vacuum source and the sealing member only during actual closing movement of the closure. Hence, the deflatable sealing member is only connected to the vacuum source and deflated for the short period of time during closing, and not after closing. Thus, any small system leaks are well tolerated and similarly any energy drain to the system is minimized.

Thus, at all times except closing, including when the closure is fully closed, the circuit is open and the solenoid valve is de-energized to block the vacuum source and provide a direct communication passage between the sealing member and the atmosphere. This allows expansion of the sealing member by resilient memory to full cross-section and hence, the provision of a tight interference seal for best passenger comfort.

In accordance with yet another aspect of the present invention, the closure motion sensor/actuator comprises a special ratcheting mechanism. More specifically, the sensor/actuator includes a flexible strip of, for example, nylon material, having a plurality of equally spaced apertures. The strip has one end attached to either the closure or the vehicle body. An actuator lever is pivotally mounted to a base plate. The distal end of the lever carries a spring loaded pawl.

A guide track is mounted to the base plate of the sensor/actuator. The guide track receives and maintains the flexible strip in a stiffened condition directly over and in engagement with the pawl. Where the end of the flexible strip is mounted to the closure, the sensor/actuator is mounted to the vehicle body. Where the end of the flexible strip is mounted to the vehicle body, the sensor/actuator is mounted to the closure.

A valve stem of the push action valve or jamb button actuator, depending on whether a push action or solenoid valve is being used, is biased into engagement with the actuator lever. As the closure is opened, the pawl rotates out of the way to provide unimpeded movement. Conversely, as the closure is closed, the spring loaded pawl rotates to its normal upright position and engages serially in apertures in the flexible strip as they move past. At this point, further rotation of the pawl is prevented and the force applied by the strip causes the lever to rotate on its hinge and actuate the valve. The rapid engagement of the pawl with the apertures is effective to keep the actuator lever depressed. Thus, during the closing movement of the closure, with the actuator lever depressed, the valve (push action or solenoid operated) is actuated to provide communication between the vacuum source and the sealing member. Accordingly, the sealing member is deflated to allow closing of the closure with the desired reduced effort, and allow the passage of air so as to substantially eliminate the problem of compression shock.

An enlarged opening may be provided at the proximal end in the flexible strip in the embodiments where a single valve or single switch is being used in the circuit. This enlarged opening is designed to receive the pawl. Accordingly, the valve actuator button and the valve stem are biased back to the original position pushing the lever upwardly and the pawl into the enlarged opening once the closure is closed. This results in the single valve system being effective in blocking the flow line to the vacuum source and returning fluid communication between the sealing member and atmosphere. Where dual valves/switches are utilized, this opening is not required. In either case, the sealing member reexpands to its full cross-section as it is opened to the atmosphere, to provide tight interference sealing between the closure and vehicle body.

Advantageously, the system of the present invention provides the advantages of reduced closing effort, elimination of compression shock and a higher integrity seal for a vehicular closure. Further, using inexpensive off-the-shelf and reliable components, and only a single centralized vacuum source, results in additional advantages. Where space is limited, such as in some compact, and in subcompact vehicles, the concept can be used for the first time.

Still other objects of the present invention will become readily apparent to those skilled in this art from the following description wherein there is shown and described a preferred embodiment of this invention, simply by way of illustration of one of the modes best suited to carry out the invention. Several alternative embodiments are also shown. As will be realized, the invention is capable of still other embodiments and its several details are capable of modifications in various, obvious aspects all without departing from the invention. Accordingly, the drawings and description will be regarded as illustrative in nature and not as restrictive.

BRIEF DESCRIPTION OF THE DRAWING

The accompanying drawings incorporated in and forming a part of the specification, illustrates the several aspects of the present invention, and together with the description serves to explain the principles of the invention. In the drawings:

FIG. 1 is a broken away side view of a vehicle equipped with the apparatus of the present invention for sealing between a closure and a vehicle body;

FIG. 2 is a detailed side elevational view of the closure motion sensor/actuator of the apparatus of the present invention, showing rotation of the pawl in response to opening movement of the closure;

FIG. 3 is a view of the sensor/actuator of FIG. 2 showing operation in response to closing movement of the closure;

FIG. 5 is a schematical representation showing one embodiment of the apparatus of the present invention incorporating a single mechanical push action valve to control inflation/deflation of the sealing member;

FIG. 6 is a schematical representation of an alternative embodiment of the apparatus of the present invention utilizing a three-way solenoid valve connected to a power source through a single switch;

FIG. 7 is a schematical representation of an alternative embodiment of the apparatus of the present invention showing dual mechanical push action valves in series;

Figure 4:
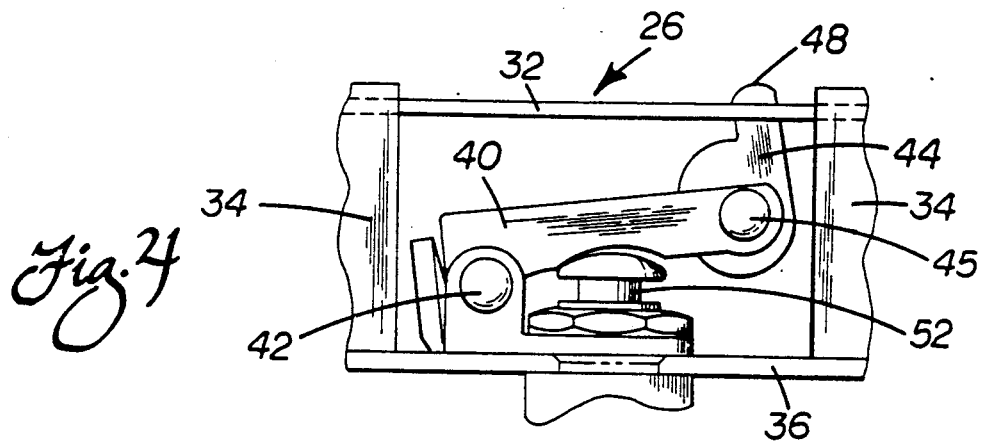
FIG. 4 is a view of the sensor/actuator when the closure is in the closed position and the pawl is received in an enlarged opening in the overlying flexible strip.

Reference will now be made in more detail to the present preferred and alternative embodiments of the invention, the specific examples of which are illustrated in these accompanying drawings.

DETAILED DESCRIPTION OF THE INVENTION

A sealing system or apparatus 10 of the present invention is provided for tightly sealing a closure, such as a door or closure D on an automobile. As best shown in FIG. 1, and the schematical representations of various systems in FIGS. 5-8, the apparatus 10 includes a sealing member or weatherstrip 12 having a bulbular or tubular section 14. The sealing member 12 is mounted to the face F of the door jamb or frame or vehicle body B by means of a mounting section 16 (see FIG. 5). A one-way clip (not shown), adhesive or any other appropriate means known in the art may be utilized to secure the sealing member 12 in place. The sealing member 12 is constructed of EPDM or other elastomeric material. In this way, the sealing member 12 is provided with sufficient resiliency to furnish a tight sealing engagement with the door D when in the closed position with the sealing member 12 expanded by venting to the atmosphere. Of course, since the sealing member 12 forms a ring extending around the entire periphery of the door opening, complete sealing of the opening is provided. As a result, the passage of air and moisture between the door D and the door jamb face F is prevented.

As best shown in FIGS. 1 and 5, the sealing member 12 is connected to a vacuum source 18, such as the engine vacuum reserve tank, an electrical vacuum pump, or a vacuum reserve tank backed-up by an electrical vacuum pump, by means of a flow control circuit generally designated by reference numeral 20. In the preferred embodiment shown in FIGS. 1 and 5, the flow control circuit 20 includes a flexible air flow line 22 extending from the sealing member 12 to a mechanical three-way push action valve 24. The valve 24 is actuated by a combined closure motion sensor and valve actuator, generally designated by reference numeral 26, and described in greater detail below. Together, the closure movement sensor/actuator 26 and the three-way valve 24 serve to regulate the operation of the sealing apparatus 10.

More particularly, during closing movement of the door D, the push action valve 24 is actuated to the phantom line position (shown in FIG. 5). This provides direct communication through flow control lines 28 and 22 from the vacuum source 18 to the sealing member 12. Accordingly, during closing motion, and only during closing of the door, the sealing member 12 is deflated and collapsed as shown in the corresponding phantom line outline. This serves to reduce the cross-section of the sealing member 12 thereby reducing the degree of interference between the sealing member and the door D as the door closes and latches. This results in a decrease in the effort required to close and latch the door D. Additionally, it serves to provide a space or gap through which air may pass from the interior of the vehicle as the door closes. Accordingly, any buildup of air pressure inside the passenger compartment is relieved and compression shock is substantially avoided. This serves to significantly increase the consumer satisfaction.

Once closed, and at all other times including opening movement of the door D, valve 24 remains deactivated in its home position, as shown in full line in FIG. 5. Thus, the valve 24 serves to provide fluid communication through the air flow lines 22 and 30 from the atmosphere to the sealing member 12. This venting to ambient pressure serves to reexpand the sealing member 12 through resilient memory of the sealing member itself so as to provide the desired increased interference fit for maximum sealing of the door opening against the passage of air and moisture.

The closure movement sensor/actuator 26 for controlling operation of the valve 24 is best shown in FIGS. 2 and 3. The sensor portion includes a flexible nylon strip 32. As shown in FIG. 1, a proximal end of the strip 32 is fastened to the closure or door D. Advantageously, due to the flexibility of the strip material, the strip 32 bends as necessary to snake around frame components, such as the door pillar P.

As best shown in detail in FIG. 2, the strip 32 is received in the sensor/actuator 26 through a pair of guide blocks 34. The guide blocks form the guide track and together serve to stiffen the strip therebetween (see FIGS. 2 and 4a). Each guide block 34 is mounted to a base plate 36. The base plate 36 may be conveniently mounted to the body of the vehicle, such as to pillar P, in or near the door jamb as shown in FIG. 1.

An actuator portion of the sensor/actuator includes a lever 40 mounted for pivotal movement about a hinge 42. A spring loaded pawl 44 is pivotally mounted about a pin 45 on the free end of the lever 40. As shown, the guide track maintains the stiffened strip 32 in engagement with the pawl 44. In other words, the guide blocks 34 stretch the strip 32 and effectively limit its movement relative to the pawl 44 to a back-and-forth motion.

As the door D is swung open, the strip 32, due to its stiffness, is pushed in the direction of action arrow A (see FIG. 2). The force of movement of the strip 32 is applied to the pawl 44 due to its engagement therewith. The force serves to overcome the spring bias action of the pawl 44 to cause it to rotate downwardly (in the direction of action arrow B) to the release position shown in FIG. 2. The pawl 44 remains in the release position as long as the door is held open, the lever 40 is lifted and the valve 24 not actuated.

As the door D is reversed and swung toward a closed position, the strip 32 reverses and moves in the direction of action arrow C, as shown in FIG. 3. As shown in FIG. 4a, the strip 32 includes a series of closely spaced, aligned apertures 46. As the closure or door D is closed, the spring loading serves to bias the pawl 44 so that the tip 48 substantially immediately engages in one of the apertures 46. The apertures 46 are, however, sufficiently small to prevent the tip 48 of the pawl 44 from extending completely through the strip 32. Consequently, the pawl 44 is simply momentarily caught and rotated to a fully upright position (note FIG. 3 and action arrow B'). As this occurs, the base 50 of the pawl 44 engages a stop (not shown) on the lever 40 short of going over center and further rotation of the pawl is prevented. Accordingly, application of continued closing force in the direction of action arrow C causes the lever 40 to rotate downwardly about the hinge 42. The curved edge of tip 48 of the pawl 44 serially and rapidly engages the apertures providing sufficient friction to keep the pawl in the FIG. 3 position. In this way, the lever 40 is held depressed against the actuating button 52 of the valve stem of the push action valve 24.

The valve 24 is now open to the central vacuum source 18 (see phantom line position shown in FIG. 5). Thus, the sealing member 12 is now subject to the evacuation, and is deflated (see phantom line outline in FIG. 5).

An enlarged opening 54 in the strip 32 is positioned in direct alignment over the tip 48 of the pawl in the fully closed position. The enlarged opening 54 is of sufficient size to fully receive the tip 48 of the pawl 44. The actuator button 52 of the valve 24 is biased with a sufficient force by means of a spring (not shown) to lift the lever 40 and push the pawl 48 into the opening 54 (see FIG. 4). This serves to return the valve 24 to the position shown in full line in FIG. 5 opening the sealing member 12 to the atmosphere. Thus, the sealing member reexpands to provide a tight interference seal between the door D and the jamb face F of the vehicle body B.

Advantageously, the closure motion sensor/actuator 26 effectively provides consistent and reliable operation for each opening and closing cycle of the door D. Further, it should be appreciated that the sensor/actuator 26 and push action valve 24 cooperate to efficiently control the operation of the sealing apparatus 10 so as to effectively limit application of negative pressure to the sealing member 12 only during closing movement of the door D. At all other times, including when fully closed, the sealing member 12 is vented to the atmosphere. Advantageously by limiting vacuum application to the relatively short time (one or two seconds) during closing motion, drain on the vacuum system is minimized. Further, the adverse affects of leaks in the system, including pinhole leaks inherent in the structure of the sealing members themselves especially after several years of service, are effectively eliminated.

Since a vehicle includes multiple closures, such as driver and passenger side doors, and a hatchback lid or truck lid, a second flow control circuit 20' identical to the flow control circuit 20 is illustrated in FIG. 5 to highlight the concept of the centralized vacuum source 18 and multiple sealing members. Of course, operation of the second flow control circuit 20' is identical to the operation of flow control circuit 20 as described above. Together, the flow control circuits 20, 20' allow selective application of negative pressure to the sealing member 12, 12' or others. Each circuit cooperates with a corresponding door when being closed at any particular time.

An alternative embodiment of the present invention is schematically shown in FIG. 6. In this embodiment, the closure motion sensor 26 is operatively connected as described above to a normally open electrical solenoid switch 60. During closing movement of the door D, actuator lever 40 is forced downwardly to depress button actuator 61 of the switch 60. This serves to close the circuit between electrical power source 62 and a solenoid valve 64. When activated, the valve 64 moves to the phantom line position shown in FIG. 6 providing direct communication between the central vacuum source 18 and the sealing member 12. As described above, this serves to deflate the sealing member 12 and allow the door D to close and latch with a smooth action under application of a relatively low closing force.

Figure 4A:
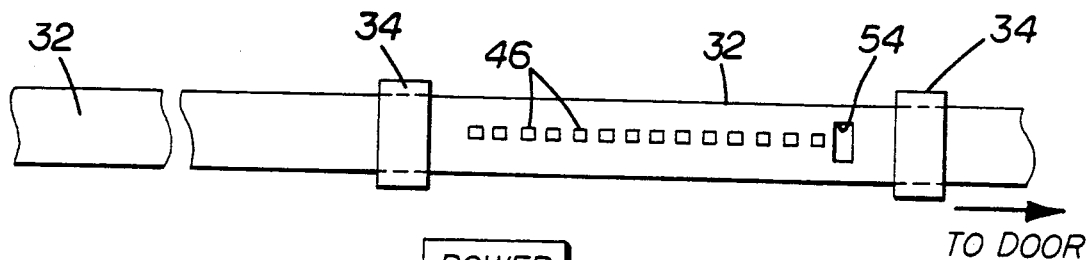
FIG. 4a is a top plan view of the flexible strip of the sensor shown in FIG. 4.

Following closing, the actuator button 61 is biased so as to raise the lever 40 and the pawl 48 into the opening 54 in the flexible strip 32 (see FIG. 4). This deactivates the valve 64 and returns the connection to the full line open to atmosphere position. Accordingly, the sealing member 12 expands as described above to provide a tight interference fit and seal. The valve 64 remains in this position with the sealing member 12 open to the atmosphere even during the opening of the door (see FIG. 2). As described above, it is only upon closing motion that the switch 60 is closed to connect the vacuum source 18 with the sealing member 12.

Another alternative embodiment is schematically represented in FIG. 7. In this embodiment a pair of mechanical push action valves 66, 68 are utilized to control and regulate the operation of the flow control circuit 20. A three-way push action valve 66 and two-way push action valve 68 are serially connected in the air flow line 70 between the sealing member 12, the vacuum source 18 and atmosphere. The three-way valve 66 includes a valve stem and button actuator,, schematically shown at 71, mounted in the door jamb F in a manner similar to a dome light switch actuator, as is known in the art. More specifically, when the door D is closed, the button actuator 71 is depressed. When the actuator 71 is depressed, the three-way valve is switched to the full line position shown in FIG. 7 providing communication from the atmosphere to one port of the two-way valve 68. At all other times, including opening and closing of the door D, the actuator 71 is biased outwardly and the three-way valve 66 remains in the position (note phantom line) providing communication with the vacuum source 18.

The two way valve 68 is operated by the motion sensor/actuator 26, substantially as described above. The only difference is that the flexible strip 32 need not include the enlarged opening 54. Thus, both during closing and when the door is closed, the sensor/actuator 26 is held in the position shown in FIG. 3, with the lever 40 depressed and the sealing member 12 communicating with the valve 66.

In contrast, when the door D is being opened, the strip 32 is moving to the left, as shown by action arrow A in FIG. 2. Accordingly, the pawl 44 rotates as shown, and the two-way valve 68 raises the actuator lever 40 and returns the valve 68 to its closed position, shown in phantom line in FIG. 7. Accordingly, when the door is being opened, the air line 70 between the three-way valve 66 and the sealing member 12 is blocked by the valve 68.

Thus, reviewing the operation of the two push action valve embodiment disclosed in FIG. 7, as the door is opening, the three-way valve 66 provides communication between the vacuum source 18 and the two-way valve 68. The two way valve 68 is, however, closed to block communication between the vacuum source 18 and the sealing member 12. In contrast, during closing of the door, both the three-way valve 66 and the two-way valve 68 are open to provide direct communication between the vacuum source 18 and the sealing member 12. Accordingly, the sealing member 12 deflates and collapses so as to allow the door D to be latched with the desired minimum effort. Once the door is closed, the three way valve 66 is switched by the button actuator 71 to provide communication through the two-way valve 68 between the sealing member 12 and the atmosphere. This opening to the atmosphere serves to cause the sealing member 12 to reexpand to full cross-section and provide the tight interference seal.

Figure 8:
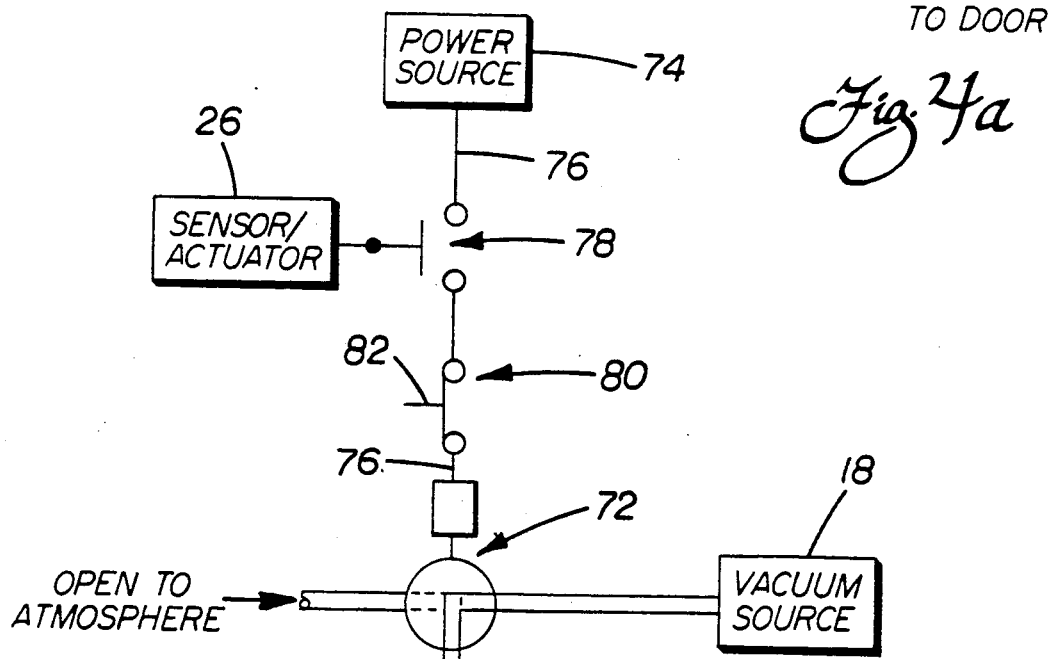
FIG. 8 is a schematical representation of still another alternative embodiment of the apparatus of the present invention including a three-way solenoid valve connected to a power source through dual electrical switches.

Yet another embodiment of the present invention is schematically represented in FIG. 8. The control circuit 20 of this embodiment incorporates a three-way solenoid valve 72 powered by an electrical power source 74 and includes a pair of switches 78, 80 in series. Switch 78 is a normally open switch that is connected to the door motion sensor/actuator 26, modified as described above with respect to the embodiment shown in FIG. 7. More specifically, the flexible strip 32 does not include the enlarged opening 54 designed to receive the pawl 44 when the door is closed. Switch 80 is normally closed and includes a push button actuator 82 mounted so as to engage the door D only when it is fully closed (in a manner similar to a dome light switch actuator). The two switches connected together in series control the power to the solenoid valve 72.

During door opening, the pawl 44 of sensor 26 rotates away from the flexible strip 32 (note FIG. 2) and the switch 78 remains open. During door closing and when the door is closed, the actuator lever 40 of sensor/actuator 26 operates to cause the switch to close (see FIG. 3). In contrast, switch 80 is closed during both door opening and closing. Only when the door is closed and the button actuator 82 for switch 80 is depressed by the door D is the switch 80 open. Accordingly, it should be appreciated that the circuit 20 is only completed between the power source 74 and the solenoid valve 72 during door closing movement. Thus, at that time, the solenoid valve 72 is energized and provides direct communication between the vacuum source 18 and the sealing member 12. As a result, the sealing member 12 is deflated and collapsed only during door closing movement to provide the advantages described above. At all other times, one or the other of the switches 78 or 80 is open and the circuit is interrupted. When the solenoid valve 72 is deenergized, there is of course direct communication between the sealing member 12 and the atmosphere. Thus, it should be appreciated that when the door is fully closed, the sealing member 12 is assured of being expanded to full cross-section, and the desired tight interference seal is provided.

In summary, numerous benefits have been described which result from employing the concepts of the present invention. Advantageously, the apparatus 10 of the present invention provides the swinging vehicular closure D with the desired reduced closing effort while also providing good interference sealing. Additionally, this is done with the centralized vacuum source 18. Accordingly, duplication of parts which otherwise add to system cost and possible maintenance is avoided. Further, space requirements for the system are reduced and, accordingly, the system 10 of the present invention is adapted for use on compact and sub compact vehicles.

As the closure D is closed, the sealing member 12 is deflated to reduce interference engagement and allow closing and latching of the door with reduced effort. At the instant of closing, air can flow past the sealing member 12 so that the annoying problem of compression shock is substantially eliminated. Immediately upon closing, the sealing member 12 is vented to atmosphere allowing expansion by resilient memory to full cross-section so as to provide a desired tight interference engagement with a door for maximum sealing. In order to achieve this end, the present invention utilizes the closure motion sensor/actuator 26 including the novel ratcheting mechanism described. The flexible strip 32 includes a series of closely spaced apertures that engage the pawl 44 on the actuator lever 40 providing the desired closing motion detection and valve operation. The deflation of the sealing member 12 only upon detection of closing movement of the closure obviates the loss of vacuum inherent in other prior art arrangements.

The foregoing description of a preferred and alternative embodiments of the invention has been presented for purposes of illustration and description. It is not intended to be exhaustive or to limit the invention to the precise form disclosed. obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An apparatus for sealing between closures and a body such as a door and door jamb of a vehicle, comprising:
    a plurality of deflattable sealing members for resilient interference engagement between respective cooperating closures and said body when inflated;
    a central vacuum source;
    a flow control circuit including sensor means for sensing closing movement of a particular closure;
    valve means for selectively connecting a particular cooperating sealing member to said vacuum source for vacuum operation independently of all other sealing members;
    actuator means for said valve means operative only in response to the detected closing movement by said sensor means so as to deflate the sealing member, the deflation being sufficient to provide a reduced cross section of the sealing member resulting in reduced closing effort and allowing passage of air from said vehicle around said sealing member to substantially eliminate compression shock;
    vent means cooperating with said valve means and being operative to open sid sealing member to atmosphere at all other times so as to allow said sealing member to be at ambient pressure and expanded by resilient memory to full cross section so as to thereby provide the interference engagement and seal between said body and said closure.

2. The apparatus set forth in claim 1, wherein said valve means of said flow control circuit includes a pair of mechanical valves connected in series between said vacuum source and each said particular deflatable sealing member, one of said mechanical valves being a three way push action valve and the other being a two-way push action valve, said actuator means operating said two way valve at least during closing movement of said closure in response to said sensor means to provide communication between said vacuum source and said sealing member through said three-way valve, and second actuator means operating said three-way valve in response to the closure being fully closed to provide the communication of said sealing member through said twoway valve to the atmosphere for inflation and sealing.

3. The apparatus set forth in claim 1, wherein said flow control circuit includes an electrical power source, 'said valve means including a solenoid valve operating in response to said sensor/actuator means during closing movement of said closure.

4. The apparatus set forth in claim 1, wherein said valve means includes a mechanical push action valve operating in response to said sensor/actuator means during closing movement of said closure.

5. The apparatus set forth in claim 1, wherein said flow control circuit further includes an electrical power source and a pair of switches, said valve means including a solenoid valve connected between said vacuum source and each said particular deflatable sealing member, said solenoid valve being a three-way valve, said sensor/actuator means operating said solenoid valve by closing a normally open first switch of said pair during closing movement of said closure providing communication between said vacuum source and said sealing member to deflate said sealing member, and a normally closed second switch in series with said first switch to open in response to the closure being fully closed to operate said valve and establish communication of said sealing member to the vent means for inflation of said sealing member.

6. An apparatus for sealing between a closure and a body such as a door and door jamb of a vehicle, comprising:
   a sealing member for resilient interference engagement between a cooperating closure and said body when inflated;
   a vacuum source for generating negative pressure independently of closure movement;
   a flow control circuit including sensor means for sensing closing movement of said closure;
   valve means for connecting said sealing member to said vacuum store;
   actuator means for said valve means operative only in response to the detected closing movement by said sensor means so as to deflate the sealing member, the deflation being sufficient to provide a reduced cross section of the sealing member resulting in reduced closing effort and allowing passage of air from said vehicle around said sealing member to substantially eliminate compression shock;
   vent means cooperating with sid valve means and being operative to open said sealing member to the atmosphere at all other times so as to allow said sealing member to be at ambient pressure and expanded by resilient memory to full cross section so as to thereby provide the interference engagement and seal between said body and said closure.

7. An apparatus for sealing between a closure and a body such as a door and door jamb of a vehicle, comprising;
   a sealing member for resilient interference engagement between a cooperating closure and said body when inflated;
   a vacuum source;
   a flow control circuit including sensor means for sensing closing movement of said closure;
   valve means for connecting said sealing member to said vacuum source;
   actuator means for said valve means operative only in response to the detected closing movement by said sensor means so as to deflate the sealing member, the deflation being sufficient to provide a reduced cross section of the sealing member resulting in reduced closing effort and allowing passage of air from said vehicle around said sealing member to substantially eliminate compression shock;
   said sensor and actuator means being combined and including a flexible strip connected to said closure for movement therewith, a guide track for positioning and stiffening said strip within said sensor/actuator means, a lever pivotally mounted for engagement with said valve means and being adjacent said strip, a pivotal pawl on the free end of said lever for engagement with said strip, aperture means on said strip to force said pawl and lever against said valve means during closure motion;
   vent means cooperating with said valve means and being operative to open said sealing member to the atmosphere at all other times so as to allow said sealing member to be at ambient pressure and expanded by resilient memory to full cross section so as to thereby provide the interference engagement and seal between said body and said closure.

8. The apparatus set forth in claim 7, wherein said sensor/actuator means further includes a plurality of apertures formed in a line along said strip, said pawl extending into engagement with the strip and engaging the apertures during closing movement, said apertures forcing the pawl and lever against said valve means during the closing movement in order to operate said valve means, and an enlarged aperture at the end of the operating apertures to receive the pawl and disengage the level from said valve means.

* * * * *